United States Patent
Enriquez et al.

(10) Patent No.: US 7,003,103 B2
(45) Date of Patent: Feb. 21, 2006

(54) MODE-DEPENDENT, MULTIPLE BIAS-DRIVEN BATTERY SWITCH FOR SUBSCRIBER LINE INTERFACE CIRCUIT

(75) Inventors: Leonel Ernesto Enriquez, Melbourne Beach, FL (US); Douglas Youngblood, Palm Bay, FL (US)

(73) Assignee: Intersil Americas Inc., Milpitas, CA (US)

( * ) Notice: Subject to any disclaimer, the term of this patent is extended or adjusted under 35 U.S.C. 154(b) by 509 days.

(21) Appl. No.: 10/177,706

(22) Filed: Jun. 21, 2002

(65) Prior Publication Data

US 2003/0169873 A1    Sep. 11, 2003

Related U.S. Application Data

(63) Continuation-in-part of application No. 10/091,976, filed on Mar. 6, 2002.

(51) Int. Cl.
  *H04M 1/00*   (2006.01)
  *H04M 9/00*   (2006.01)
  *H04M 9/08*   (2006.01)

(52) U.S. Cl. .................. 379/413; 379/413.1

(58) Field of Classification Search .......... 379/399.1, 379/400, 405, 413.01, 413
See application file for complete search history.

(56) References Cited

U.S. PATENT DOCUMENTS

| 4,315,106 | A |   | 2/1982 | Chea, Jr. ................... 179/16 F |
| 5,323,461 | A |   | 6/1994 | Rosenbaum et al. ........ 379/399 |
| 5,528,688 | A |   | 6/1996 | Schorr ......................... 379/413 |
| 5,737,411 | A | * | 4/1998 | Apfel et al. ................. 379/413 |
| 6,453,040 | B1 |   | 9/2002 | Burke et al. ........... 379/387.01 |
| 6,735,302 | B1 | * | 5/2004 | Caine et al. ................. 379/405 |

* cited by examiner

*Primary Examiner*—Curtis Kuntz
*Assistant Examiner*—Alexander Jamal
(74) *Attorney, Agent, or Firm*—Allen, Dyer, Doppelt, Milbrath & Gilchrist, P.A.

(57) ABSTRACT

A mode-dependent, battery-coupling switch for a subscriber line interface circuit (SLIC) selectively adjusts its current requirements to provide optimal current handling capability irrespective of the mode of operation of the SLIC. Where current demands of the SLIC are relatively minimal (e.g., on-hook idle mode), the bias is set at a relatively small, default value. During high current demand, such as ringing and off-hook signaling, the bias is set at a relatively large value, to maintain a low voltage drop across the battery-coupling switch.

16 Claims, 1 Drawing Sheet

MODE-DEPENDENT, MULTIPLE BIAS-DRIVEN BATTERY SWITCH FOR SUBSCRIBER LINE INTERFACE CIRCUIT

CROSS-REFERENCE TO RELATED APPLICATION

The present application is a continuation-in-part of co-pending U.S. patent application Ser. No. 10/091,976, filed Mar. 6, 2002, by L. Enriquez et al, entitled: "Programmable Subscriber Line Circuit Partitioned Into High Voltage Interface and Digital Control Subsections" (hereinafter referred to as the '976 application), assigned to the assignee of the present application and the disclosure of which is incorporated herein.

FIELD OF THE INVENTION

The present invention relates in general to telecommunication systems and subsystems therefor, and is particularly directed to a mode-dependent mechanism for controllably biasing the operation of a battery supply path switch to provide optimal current handling capability of a battery supply switch unit, through which an operational voltage is supplied to a subscriber line interface circuit (SLIC), such as the partitioned SLIC architecture described in the above-referenced '976 application.

BACKGROUND OF THE INVENTION

Subscriber line interface circuits (SLICs) are employed by telecommunication service providers to interface a wireline pair with subscriber (voice—data) communication equipment. In order to be interfaced with different types of telecommunication circuits, including (single supply-based) low voltage circuits that provide digital codec functionality, the transmission channels of the SLIC must conform with a very demanding set of performance requirements, such as accuracy, linearity, is low noise, filtering, insensitivity to common mode signals, low power consumption, and ease of impedance matching programmability. In a typical application, the wireline pair to which the SLIC is connected can vary from one installation to another, and may have a significant length (e.g., on the order of multiple miles), transporting both substantial DC voltages, as well as AC signals (e.g., voice and/or ringing). As a result, it has been difficult to realize a SLIC implementation having 'universal' use in both legacy and state of the art installations.

Advantageously, this problem is successfully addressed by the SLIC architecture disclosed in the '976 application, referenced above and a portion of which is diagrammatically illustrated in FIG. 1. As shown therein, the SLIC of the '976 application is partitioned into a high voltage analog section 1, that drives tip and ring conductors 2, 3 of a subscriber loop pair 4, and a mixed signal (low voltage and digital signal processing (DSP)) section 5, which monitors and controls the operation of the high voltage analog section 1. The high voltage analog section 1 is comprised of an integrated arrangement of functional analog signal blocks, and is interfaced with a DSP codec subsection 6 and a supervisory microcontroller subsection 7 of the mixed signal section 5. The high voltage analog section 1 performs analog (e.g., voice, ringing) signal processing and interface functions of a conventional SLIC, based on control inputs and programmed parameters of the mixed signal section 5.

In addition to voice signaling, the high voltage section provides a substantial gain boost for low voltage signals, and provides both balanced and unbalanced drives for ringing, including multiple wave shapes, such as sinusoidal and trapezoidal signals. The high voltage section is also configured to supply advanced diagnostic information, for application to the low voltage digital signal processing interface. Diagnostic information may relate to tip and ring currents, and operating battery voltage.

The mixed signal section contains low voltage digital communication interface circuitry, including a digital signal processor (DSP) based coder-decoder (codec). Because the mixed signal section is digitally programmable, the partitioned SLIC architecture of the '976 application is, in effect, a 'universal' design, that may be readily programmed to comply with a variety of industry and country telecommunication standards. Programmable line circuit parameters include loop supervision, loop feed, impedance matching and test coverage.

The high voltage analog section 1 includes a receive input unit 10 that interfaces and conditions input voice and ancillary signals, including low voltage signaling and ringing signals, supplied from the codec 6, and couples complementary polarity copies of a voice signal representative current to respective tip and ring amplifier blocks 20T and 20R of a dual mode tip/ring amplifier unit 20. These tip/ring amplifier blocks are selectively biased to operate at a first (close-to-unity) gain for a first signaling mode (off-hook voice signal processing), or at an increased or 'boosted' (e.g., ×30 or ×120) gain for ancillary signal processing (e.g., on-hook signaling and ringing). The tip/ring links 2/3 are monitored via a sense amplifier 25.

Reference voltages for the tip/ring amplifier 20 are derived from a battery bias unit 30, which is coupled to the output port 43 of a battery supply switch unit 40. The battery bias unit 30 contains a set of switchable, voltage-divider networks, that are used to selectively bias tip and ring portions of the tip/ring amplifier 20 in accordance with the mode of operation of the SLIC. Battery supply switch 40 selectively couples either a relatively low battery voltage VBL that is applied to a low battery supply switch input port 41, or a relatively high battery voltage VBH that is applied to high battery supply switch input port 42 to one or more output ports (a single one of which is shown at 43, to reduce the complexity of the drawings. The low battery voltage VBL may be on the order of −60 VDC and the high battery voltage VBH may be on the order of −125 VDC. The battery supply switch output port 43 is switchably coupled to tip and ring path voltage divider networks within the battery bias unit 30. The choice of battery voltage depends upon the state of battery supply switch unit 40, whose operation of which is controlled by the mixed signal section 5.

For this purpose, as shown in FIG. 2, the low battery voltage VBL port 41 is coupled through a diode 44 to a node 51 of a battery supply path switch 50. Diode 44 allows transitioning to low battery operation when battery switch is open, or in the event high battery is removed this diode also prevents cross-conduction between VBH and VBL when battery switch 50 is closed. The battery supply path switch 50 is controlled by a battery supply switch control signal from the DSP section 5. (Although only a single set of a diode and battery supply path switch is shown, the battery supply switch unit 40 may contain plural ones of such diodes and associated switches coupled in parallel, for example, a pair of such diode-switch sets, as described in the above-referenced '976 application).

Switch node 51 is coupled to the battery supply switch output port 43, while switch node 52 is coupled to the high battery (VBH) supply switch input port 42. In addition to being coupled to the battery bias unit 30, the battery supply switch output port 43 is coupled to various circuits of the SLIC, such as power transistor circuits.

As shown in FIG. 3, the battery supply path switch 50 may be implemented by means of a Darlington-coupled pair of NPN bipolar transistors Q1-Q2, collectors of which are coupled in common to node 51 (to which the low battery voltage VBL is coupled through diode 44, and which is (default) coupled to output port 43). The emitter of transistor Q2 is coupled to node 42 (to which the high battery voltage VBH is supplied), while the base of transistor Q1 is coupled to receive base drive current from a current source 55.

In order to accommodate whatever current demand may be encountered (including ringing, and other (off-hook) high current requirements) during the various modes of operation of the SLIC, the base bias drive to transistor Q1 may be set at a relatively large current value (e.g., on the order of 50 microamps). This 'standby' current drive parameter serves to ensure that the Darlington transistor pair Q1-Q2 will be driven into full saturation and will absorb any current, including those having relatively large values (e.g., currents on the order of 70–100 mA).

Unfortunately, although such a large standby base bias current ensures that the battery supply switch will successfully handle any current demand, it also results in substantial and unnecessary power dissipation (e.g., on the order of 6 mW) during those operational modes where current requirements are relatively low. For example, during on-hook idle mode, in the absence of the need to generate a ringing signal in response to an incoming call, the current demands of the SLIC are relatively minimal, since what is essentially required is to provide just enough current to detect the user going off-hook, in association with the placement of an outgoing call. This reduced current requirement is especially imperative at an installation, such as a remote terminal, where electrical power may be supplied is by a local or back-up battery unit, the power dissipation budget for which is severely constrained.

SUMMARY OF THE INVENTION

In accordance with the present invention, the desire to tailor the current requirements of the battery supply switching unit, so as to minimize unwanted power dissipation, but still provide optimal current handling capability irrespective of the mode of operation of the SLIC, is successfully achieved by a mode-dependent battery supply switch biasing mechanism. Pursuant to the invention, the bias to the battery supply path switch transistor circuitry of the battery supply switch unit is selectively adjusted among a plurality of respectively different values, so as to controllably tailor or 'tune' the current handling requirements of the switch based upon the mode of operation of the SLIC.

In a practical implementation, the base drive to a Darlington-coupled transistor pair may be coupled through a plurality of selectively controlled switches to respectively different valued current sources that are sourced to a common (DC battery) power supply. Selective closure of one or more of the switches will define the value of the bias current used as the base drive to the transistor switch. When the current demands of the SLIC are relatively minimal (e.g., on-hook, idle mode), the base drive to the Darlington pair is supplied only by the relatively small valued bias current source. During large current modes, such as off-hook mode, or ringing mode, the base drive to the Darlington pair is supplied by the relatively large valued bias current source (which may be optionally be summed with that of the low current bias source).

DETAILED DESCRIPTION

Figure 1:
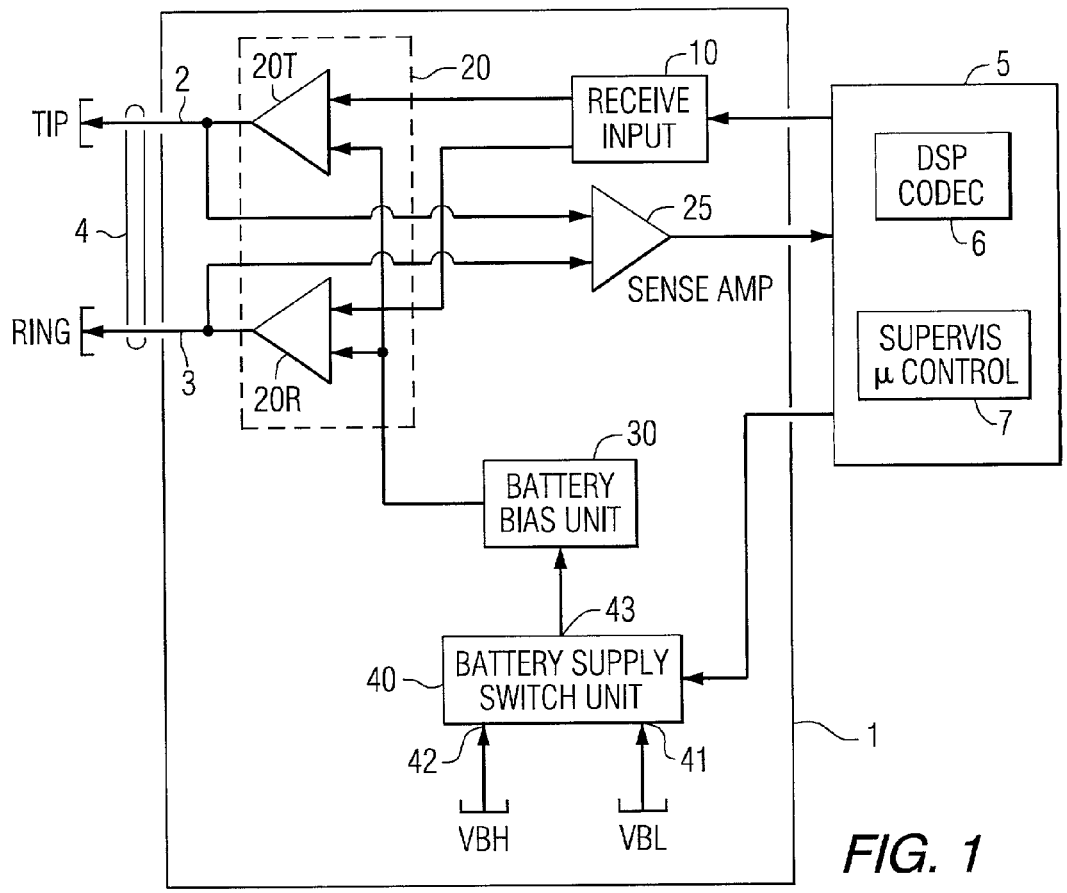
FIG. 1 diagrammatically illustrates a portion of the overall architecture of the partitioned subscriber line interface circuit disclosed in the '976 application.
Figure 2:
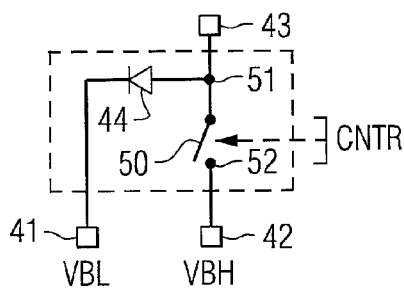
FIG. 2 shows the configuration of the battery supply switch unit of the high voltage analog section of the partitioned subscriber line interface circuit of FIG. 1.
Figure 3:
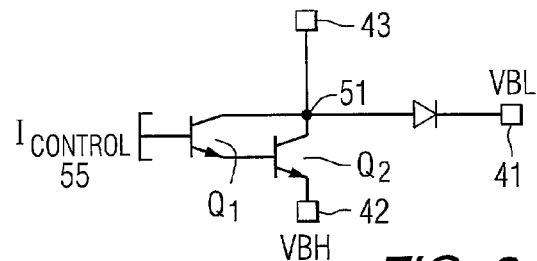
FIG. 3 is a schematic illustration of a Darlington-coupled transistor pair for implementing the battery supply path switch of the battery supply switch unit of FIG. 2.
Figure 4:
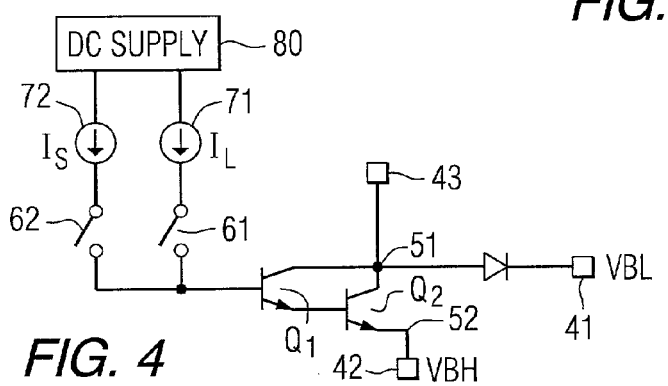
FIG. 4 is a schematic illustration of a modification of the battery supply path switch of FIG. 3 to realize a mode-dependent battery supply switch unit in accordance with the present invention.

Attention is now directed to FIG. 4, which shows the manner in which the battery supply path switch of FIG. 3 may be modified to realize a mode-dependent battery supply switch unit in accordance with the present invention. As shown therein, the base of transistor Q1 of the Darlington-coupled transistor Q1-Q2 is coupled through a plurality of selectively controlled switches 61 and 62 to respective bias current sources 71 and 72, that are sourced to a common (DC battery) power supply 80. It should be noted that the number of bias current sources is not limited to the two shown. Additional bias sources may be employed as the case requires. Only two have been shown and described in order to provide a non-limiting example. In FIG. 4, switches 61 and 62 are shown as normally open switches. Selective closure of one or both of switches 61/62 will couple its associated bias current source 71/72 to the base of transistor Q1. In the illustrated embodiment, bias current source 71 may supply a relatively large bias current $I_L$ (e.g., on the order of 50 microamps), while bias current source 62 may supply a relatively small bias current $I_s$, for example, a bias current (e.g., 10 microamps) that is a small fraction (one-fifth) of the bias current $I_L$.

In operation, base current drive to the battery supply path switch transistor circuitry Q1-Q2 is defined in accordance with the selective closure of switches 61 and 62. During on-hook idle mode, where the current demands of the SLIC are relatively minimal, switch 61 is open and switch 62 is closed, so that the base drive to the Darlington pair Q1-Q2 is supplied by the relatively small bias current $I_s$ of current source 72. Thus, in this first, low power dissipation mode, the switching transistor circuit (Q1-Q2) of the battery supply switch unit 40 is turned-on just sufficiently to handle the relatively reduced current requirements of detecting the user going off-hook.

During large current modes, such as off-hook mode, or ringing mode, switch 61 is closed and switch 62 is open, so that the base drive to the Darlington pair Q1-Q2 is supplied by the relatively large bias current $I_L$ of current source 71. In this second, high power dissipation mode, the switching transistor circuit (Q1-Q2) of the battery supply switch unit 40 is turned-on relatively hard, so that it will maintain a low voltage drop across the battery-coupling switch, and thus be able to handle the relatively large current requirements of the SLIC.

For the above examples of base drive currents supplied by current sources 71 and 72, at a battery supply voltage of 125 VDC, the power dissipation for source 71 is $(50*10^{-6}*125)$ watts=6.25 milliwatts, whereas the power dissipation for bias current source 72 is only $(10*10^{-6}*125)$ watts=1.25 milliwatts. Since only the bias current source 72 is used during standby or low current mode conditions, it can be seen that the mode-dependent biasing mechanism of the invention is capable of effectively saving a significant amount of potentially wasted power.

Although the embodiment shown in FIG. 4 switchably substitutes among plural current source in accordance with the operational mode, it should be realized that other functionally equivalent current source and switch arrangements may be employed. As a non-limiting example, for the present case of two current sources, in lieu of switching between multiple current sources, a low current source may be used during both modes, its output being summed with a reduced (e.g., 40 microamps) value for a relatively high current source during high current mode.

As will be appreciated from the foregoing description, the mode-dependent battery supply switching mechanism of the present invention is able to conform with the increasingly strict power budget requirements of subscriber line interface circuits, by selectively adjusting the current requirements for a battery supply switching unit in a manner that provides optimal current handling capability irrespective of the mode of operation of the SLIC. Where current demands of the SLIC are relatively minimal (e.g., on-hook idle mode), the bias is set at a relatively small, default value. During high current demand, the bias is set at a relatively large value, maintaining a low voltage drop across the switching unit.

While we have disclosed several embodiments in accordance with the present invention, it is to be understood that the invention is not limited thereto but is susceptible to numerous changes and modifications apparent to one skilled in the art, and we therefore do not wish to be limited to the details shown and described herein, but intend to cover all such changes and modifications as are obvious to one of ordinary skill in the art.

What is claimed is:

1. A method for supplying electrical power to a utility device comprising the steps of:
   (a) providing a controlled transistor switch circuit which is operative to couple a prescribed operational voltage to said utility device for each of respectively different modes of operation of said utility device; and
   (b) selectively adjusting current handling capability of said controlled transistor switch circuit and causing said controlled transistor switch circuit to couple said prescribed operational voltage to said utility device, for each of respectively different drive currents coupled to a drive input port of said transistor switch circuit, by selectively coupling said drive input port of said transistor switch circuit to receive said respectively different drive currents for said respectively different modes of operation of said utility device and,
   wherein said utility device comprises a subscriber line interface circuit (SLIC), and wherein said controlled transistor switch circuit is operative to couple one of a high battery supply voltage and a low battery supply voltage to said SLIC in association with respectively different on-hook and off-hook modes of operation of said SLIC.

2. The method according to claim 1, wherein said transistor switch circuit is coupled to receive drive current from a switching circuit containing a plurality of switches coupled between associated current sources and a drive input port of said transistor switch circuit, and wherein a first condition of said plurality of switches is a normally open condition for both of said switches, a second condition of said plurality switches is an open condition of one of said switches and a closed condition for another of said switches so as to supply a first current to said drive input port of said transistor switch circuit, and a third condition of said plurality of switches is a closed condition of said one of said switches and an open condition for said another of said switches so as to supply a second current to said drive input port of said transistor switch circuit.

3. The method according to claim 2, wherein a third condition of said plurality of switches is a closed condition of said one and said another of said switches so as to supply a combined current to said drive input port of said transistor switch circuit.

4. The method according to claim 1, wherein said SLIC includes
   a tip/ring amplifier unit to which currents representative of voice signal signals are coupled, and having tip and ring outputs adapted to be coupled to tip and ring conductors of a subscriber loop pair, said tip/ring amplifier unit having respectively different gain characteristics for said respectively different modes of operation of said SLIC, and
   a battery bias unit coupled with said tip/ring amplifier unit and said controlled transistor switch circuit, and being operative to bias said tip/ring amplifier unit in accordance with a voltage applied thereto by said controlled transistor switch circuit.

5. The method according to claim 4, wherein said battery bias unit is operative to bias said tip/ring amplifier in accordance with said high battery supply voltage for a first, relatively high gain characteristic of said tip/ring amplifier associated with off-hook mode and on-hook ringing mode of operation of said SLIC, and wherein step (b) comprises setting said current handling capability of said controlled switch circuit at a relatively large value for said off-hook mode and on-hook ringing mode of operation of said SLIC.

6. The method according to claim 5, wherein step (b) comprises setting said current handling capability of said controlled switch circuit at a relatively small value for on-hook idle mode of operation of said SLIC.

7. An apparatus for supplying electrical power to a utility device comprising:
   a controlled transistor switch circuit which is operative to couple a selected operational voltage to said utility device for each of respectively different modes of operation of said utility device; and
   a selectively controlled drive circuit, which is operative to selectively adjust current handling capability of said controlled transistor switch circuit and cause said controlled transistor switch circuit to couple said selected operational voltage to said utility device, for each of respectively different drive currents coupled to a drive input port of said transistor switch circuit, by selectively coupling said drive input port of said transistor switch circuit to receive said respectively different drive currents for said respectively different modes of operation of said utility device and,
   wherein said utility device comprises a subscriber line interface circuit (SLIC), and wherein said controlled transistor switch circuit is operative to couple a high battery supply voltage to said SLIC in association with respectively different on-hook and off-hook modes of operation of said SLIC.

8. The apparatus according to claim 7, wherein said transistor switch circuit is coupled to receive drive current from a switching circuit containing a plurality of switches coupled between associated current sources and a drive input port of said transistor switch circuit, and wherein a first condition of said plurality of switches is a normally open condition for both of said switches, a second condition of said plurality switches is an open condition of one of said switches and a closed condition for another of said switches so as to supply a first current to said drive input port of said transistor switch circuit, and a third condition of said plurality of switches is a closed condition of said one of said switches and an open condition for said another of said switches so as to supply a second current to said drive input port of said transistor switch circuit.

9. The apparatus according to claim 8, wherein a third condition of said plurality of switches is a closed condition of said one and said another of said switches so as to supply a combined current to said drive input port of said transistor switch circuit.

10. The apparatus according to claim 7, wherein said SLIC includes
   a tip/ring amplifier unit to which currents representative of voice signal signals are coupled, and having tip and ring outputs adapted to be coupled to tip and ring conductors of a subscriber loop pair, said tip/ring amplifier unit having respectively different gain characteristics for said respectively different modes of operation of said SLIC, and
   a battery bias unit coupled with said tip/ring amplifier unit and said controlled transistor switch circuit, and being operative to bias said tip/ring amplifier unit in accordance with a voltage applied thereto by said controlled transistor switch circuit.

11. The apparatus according to claim 10, wherein said battery bias unit is operative to bias said tip/ring amplifier in accordance with said high battery supply voltage for a first, relatively high gain characteristic of said tip/ring amplifier associated with off-hook mode and on-hook ringing mode of operation of said SLIC, and wherein said selectively controlled drive circuit is operative to set said current handling capability of said controlled switch circuit at a relatively large value for off-hook mode and said on-hook and ringing mode of operation of said SLIC.

12. The apparatus according to claim 11, wherein said selectively controlled drive circuit is operative to set said current handling capability of said controlled transistor switch circuit at a relatively small value for on-hook idle mode of operation of said SLIC.

13. A battery voltage supply circuit for a subscriber line interface circuit (SLIC) having a multi-mode tip/ring amplifier unit, tip and ring outputs of which are adapted to be coupled to tip and ring conductors of a subscriber loop pair, and inputs of which are coupled to receive voice, signaling and ringing signals in accordance with the mode of operation of said SLIC, and a biasing unit, to which a battery voltage is coupled, and which is operative to controllably couple a selected bias voltage to said tip/ring amplifier unit in accordance with said mode of operation of said subscriber line interface circuit, said battery voltage supply circuit comprising:
   a battery voltage switch circuit which is operative to couple said battery voltage to said biasing unit; and
   a selectively controlled drive circuit, which is operative to adjust current handling capability of said battery voltage switch circuit and cause said battery voltage switch circuit to couple said battery voltage to said biasing unit, based upon the mode of operation of said SLIC; and wherein
   said battery voltage switch circuit comprises a transistor switch circuit, and wherein said selectively controlled drive circuit is operative to couple respectively different drive currents to said transistor switch circuit and cause said transistor switch circuit to couple said battery voltage to said biasing unit for each of said respectively different drive currents, in accordance with respectively different modes of operation of said SLIC.

14. The battery voltage supply circuit according to claim 13, wherein said transistor switch circuit is operative to switchably couple a one of a high battery supply voltage and a low battery supply voltage to said biasing unit in association with respectively different on-hook and off-hook modes of operation of said SLIC.

15. The battery voltage supply circuit according to claim 13, wherein said biasing unit is operative to bias said tip/ring amplifier in accordance with a high battery supply voltage for a first, relatively high gain characteristic of said tip/ring amplifier associated with off-hook mode and on-hook ringing mode of operation of said SLIC, and wherein said selectively controlled drive circuit is operative to set said current handling capability of said battery voltage switch circuit at a relatively large value for said off-hook mode and on-hook and ringing mode of operation of said SLIC.

16. The battery voltage supply circuit according to claim 15, wherein said selectively controlled drive circuit is operative to set said current handling capability of said battery voltage switch circuit at a relatively small value for on-hook idle mode of operation of said SLIC.

* * * * *